United States Patent Office 3,075,015
Patented Jan. 22, 1963

3,075,015
PROCESSES FOR THE RECOVERY OF PHENOLS AND CARBONYL COMPOUNDS FROM CRUDE BISPHENOLIC CONDENSATION PRODUCTS
Karl-Heinrich Meyer, Krefeld-Bockum, and Hermann Schnell, Krefeld-Urdingen, Germany, assignors to Farbenfabriken Bayer Aktiengesellschaft, Leverkusen, Germany, a corporation of Germany
No Drawing. Filed Dec. 22, 1959, Ser. No. 861,194
Claims priority, application Germany Dec. 31, 1958
3 Claims. (Cl. 260—586)

The present invention relates to processes for the recovery of phenols and ketones or aldehydes from crude alkali-soluble bisphenolic condensation products of aldehydes and ketones with phenols.

In the condensation of aromatic mono- or poly-hydroxy compounds with oxo or carbonyl compounds, such as aldehydes and ketones, in the presence of water-binding agents, phenolic compounds are obtained in which two or more of the aromatic hydroxy compounds are connected to alkylidene radicals. Thus, for example, there is obtained from phenol and acetone mainly 2,2-(4,4'-dihydroxy-diphenyl)-propane which is also known as 2,2-bis(4-hydroxyphenyl)propane, 4,4'-isopropylidenediphenol, and bisphenol A. However, products are also formed at the same time in which the condensation of the phenol does not take place in the para or 4 position but in which an ortho hydrogen atom is split off. These unsymetrically formed dihydroxy-diphenyl-propanes can, in the same way as 2,2-(4,4'-dihydroxy-diphenyl)-propane, be further condensed with acetone and phenol or with further dihydroxy-diphenyl-propane to give polyhydroxy compounds. Finally, there are also formed small amounts of compounds which are not soluble in alkalis and which apparently possess a pyran structure. Similar reaction mixtures result quite generally in the condensation of aromatic mono- or poly-hydroxy compounds with oxo compounds.

The composition of the crude products is always dependent upon the nature of the reaction components, on their relative amounts in the reaction mixture, as well as on the condensation agent and particularly on the reaction temperature, since the condensation products from aromatic mono- or poly-hydroxy compounds with oxo compounds are not stable at elevated temperature but split into aromatic hydroxy compounds and alkenyl phenols. Thus, for example, the condensation products from phenol and acetone split into phenol and isopropenyl-phenol. However, the alkenyl phenols for their part are not stable at the temperatures at which they are formed but form resinous materials and also, to a certain extent, alkyl phenols, by complex polymerization and disproportionation reactions. Thus, for example, by the distillation of 2,2-(4,4'-dihydroxy-diphenyl)-propane at atmospheric pressure, about 50 percent phenol is obtained, together with undefined resins and isopropyl phenol. The splitting temperature is considerably lowered by the addition of alkalis or acids. Thus, for example, 2,2-(4,4'-dihydroxy-diphenyl)-propane can be split into phenol and polymerization products of isopropenyl phenol under the influence of alkalis or acids even at temperatures only slightly above 100° C. In a similar manner, these splitting reactions also take place in the presence of steam.

We have now, surprisingly, found that alkali-soluble condensation products from phenols and oxo compounds are hydrolyzed almost completely with water under the influence of basic materials at temperatures between about 150 and 350° C., and especially between about 200 and 300° C., under pressure to regenerate and yield the compounds from which they were formed. In this case, alkenyl phenols or their polymerization products do not occur in the reaction products. In the splitting of condensation products of phenols and aliphatic ketones by the reaction of phenols with the oxo compounds, secondary reactions can, surprisingly, be practically completely avoided. Derivatives of cycloaliphatic, araliphatic and aromatic ketones, as well as of aldehydes, on the other hand, form, during the splitting, variable amounts of resinous condensation products as by-products such as also result in the reaction of the phenols with such oxo compounds as by-products.

Thus, the present invention is concerned with a process for the splitting of alkali-soluble condensation products from phenols and oxo compounds which is characterized in that the condensation products are heated in the presence of basic materials and water to temperatures between about 150 and 350° C., and especially between about 200 and 300° C., under pressure.

Alkali-soluble condensation products from phenols and oxo compounds of the bisphenol type within the meaning of the invention are, for example, 1,1-(4,4'-dihydroxy-diphenyl)-ethane (acetaldehyde condensation product), 4,4'-dihydroxy-triphenyl-methane (benzaldehyde condensation product), 4,4'-dihydroxy-3,3',5,5'-tetramethyl-diphenyl-methane (condensation product of formaldehyde and 3,5-dimethylphenol), 2,2-(4,4'-dihydroxy-diphenyl)-propane (2-propanone, i.e., acetone, condensation product), 2,2-(4,4'-dihydroxy-3,3'-dimethyl-diphenyl)-propane (condensation product of 3-methylphenol and 2-propanone), 2,2-(4,4'-dihydroxy-diphenyl)-butane (2-butanone, i.e., methyl ethyl ketone, condensation product), 2,2-(4,4'-dihydroxy-diphenyl)-pentane (2-pentanone, i.e., methyl propyl ketone, condensation product), 2,2-(4,4'-dihydroxy-diphenyl)-4-methyl-pentane (4-methyl-2-pentanone, i.e., methyl isobutyl ketone, condensation product), 3,3-(4,4'-dihydroxy-diphenyl)-pentane (3-pentanone, i.e., diethyl ketone, condensation product), 1,1-(4,4'-dihydroxy-diphenyl)-cyclohexane (cyclohexanone condensation product), 2,2-(4,4'-dihydroxy-diphenyl)-2-phenyl-ethane (acetophenone, i.e., methyl phenyl ketone or 2-phenyl-2-ethanone, condensation product) and, (4,4'-dihydroxy-diphenyl)-diphenyl-methane (benzophenone condensation product), as well as the alkali-soluble aromatic di- and poly-hydroxy compounds of variable structure produced during their production.

For the splitting reaction, the crude products obtained by the production of said polyhydroxy compounds or the pure 4,4'-dihydroxy polyphenyl alkanes or also the separated alkali-soluble by-products can be used without the yields of the mentioned fission products being substantially influenced.

Suitable basic materials for the process are particularly the alkali-metal and alkaline-earth-metal hydroxides and carbonates, as well as, for example, ammonia.

The reaction can, for example, be carried out in such a manner that the materials to be split are dissolved in dilute aqueous solutions of alkali-metal hydroxides. The solution is heated in an autoclave at temperatures between about 150 and 320° C. and at pressures of about 5–150 atmospheres until the complete splitting has taken place. At temperatures of about 300° C. and with, for example, the condensation products from acetone and phenol, this is the case after about 30 minutes, and at 240° C. after about three hours. The splitting reaction can also be advantageously carried out continuously.

It is then advantageous first to distill off the oxo compounds from the reaction mixture. Subsequently, the aromatic hydroxy compounds contained in the residue are liberated by neutralization and separated either by extraction or distillation.

The process particularly renders possible the economic use in a simple manner of the alkali-soluble by-products obtained in the production of 4,4'-dihydroxy-polyphenyl alkanes by recovering their valuable components.

The following examples are given for the purpose of illustrating the present invention:

Example 1

A homogenous solution of 100 grams 2,2-(4,4'-dihydroxy-diphenyl)-propane, 35 grams sodium hydroxide and 440 grams water are heated for three hours with stirring at 240° C. at an initial pressure of 20 atmospheres in an autoclave having a capacity of 1 liter, the pressure rising to 70 atmospheres. The alkaline solution is subsequently cooled to 20° C. and distilled in a column, 23 grams acetone (90.5 percent of theory) distilling over. The residue is acidified to a pH of 5 with 50 percent phosphoric acid and the phenol driven over with steam. In this way, 80.4 grams phenol (97.5 percent of theory) are obtained.

In a series of further experiments and in the same manner, portions consisting of 100 grams of 2,2-(4,4'-dihydroxy-diphenyl)-propane are hydrolized with other basic materials instead of with sodium hydroxide and the amounts of phenol split off obtained in the manner indicated above. In this way, the yields given in the following table were obtained:

| Base | Water, g. | Amount of phenol split off, g. | Theoretical, percent yield of phenol |
|---|---|---|---|
| 49 g. KOH | 440 | 82.5 | 100 |
| 46.5 g. Na$_2$CO$_3$ | 440 | 69.3 | 84 |
| 31 g. NH$_4$OH | 440 | 62.7 | 76 |

Example 2

For the purpose of a continuous carrying out of the hydrolysis for different reaction periods and at different temperatures, an oil bath heated with a nickel worm (total volume 600 cm.$^3$, internal diameter 8 millimeters) is used through which there is continuously pumped a solution of 100 grams 2,2-(4,4'-dihydroxy-diphenyl)-propane and 35 grams sodium hydroxide in 440 grams water at the corresponding saturation pressure of steam.

The recovery of the products from the reaction mixture obtained under the different conditions is carried out in the manner described in Example 1. The results are summarized in the following table:

| Temperature, degrees | Reaction time, minutes | Theoretical, percent yield of phenol | Theoretical, percent yield of acetone |
|---|---|---|---|
| 200 | 30 | 15.5 | 0 |
| 200 | 60 | 29.5 | 16 |
| 270 | 10 | 71 | 60 |
| 270 | 30 | 93 | 83 |
| 270 | 60 | 97.5 | 87.5 |
| 300 | 10 | 80 | 79 |
| 300 | 30 | 98.5 | 88.5 |
| 300 | 60 | 99 | 89 |

Example 3

Under the same experimental conditions as were used in Example 1, 100 grams of the resinous substance such as is obtained and separated as by-product in the production of pure 2,2-(4,4'-dihydroxy-diphenyl)-propane as described in patent application Serial No. 626,088, filed December 4, 1956 (now abandoned), are heated with 35 grams sodium hydroxide and 440 grams water. In this case, the yield of acetone amounts to 19 grams (75 percent of theory) and of phenol to 68.5 grams (83 percent of theory).

Example 4

A solution of 100 grams 2,2-(4,4'-dihydroxy-diphenyl)-pentane and 31.5 grams sodium hydroxide in 395 grams water is heated for four hours at 240° C. in the manner described in Example 1. 29.5 grams methyl propyl ketone (88 percent of theory) and 72.5 grams phenol (98.7 percent of theory) are obtained.

Example 5

100 grams 1,1-(4,4'-dihydroxy-diphenyl)-cyclohexane and 30 grams sodium hydroxide in 375 grams water are heated for five hours at 240° C. in the manner described in Example 1. In this case, the ketone is obtained from the alkaline solution by extracting with benzene. Yield of cyclohexanone is 8 grams (21.9 percent of theory) and of phenol 56.5 grams (80.7 percent of theory).

Example 6

A solution of 100 grams 4,4'-dihydroxy-triphenyl ethane (referred to hereinbefore as 2,2-(4,4'-dihydroxy-diphenyl)-2-phenylethane) and 28 grams sodium hydroxide in 360 grams water is heated for five hours at 240° C. in the manner described in Example 1. The resulting acetophenone is removed from the alkaline solution with benzene. Yield of acetophenone is 19 grams (45.9 percent of theory) and of phenol 45 grams (69.4 percent of theory).

Example 7

A solution of 100 grams 3,3',5,5'-tetramethyl-2,2'-dihydroxy-diphenyl-methane and 31 grams sodium hydroxide in 380 grams water are heated for 5 hours at 240° C. in the manner described in Example 1. The organic layer, which separates out upon neutralization, is separated off and distilled. Yield of 2,4-dimethyl-phenol is 58 grams (79 percent of theory).

We claim:

1. A process for the recovery of a phenol and a carbonyl compound from a crude alkali-soluble bisphenolic condensation product of
    (a) a phenol of the group consisting of phenol and methyl-substituted hydroxybenzenes, and
    (b) a carbonyl compound of the group consisting of formaldehyde, acetaldehyde, benzaldehyde, lower alkanones having fewer than six carbon atoms, acetophenone, cyclohexanone, and benzophenone, which comprises heating the said condensation product while dissolved in an aqueous solution of a base of the group consisting of amonia and alkali-metal and alkaline-earth-metal hydroxides and carbonates at a pressure between about 5 and about 150 atmospheres and a temperature between about 150 and 320° C., and subsenquently separating and recovering the phenol and the carbonyl compound from the resulting hydrolysis products.

2. A process as defined in claim 1, in which the heating is conducted at a temperature between about 200 and about 300° C.

3. A process as defined in claim 1 in which the alkali-soluble condensation product is a crude mixture of products obtained in the preparation of bisphenol A.

References Cited in the file of this patent

UNITED STATES PATENTS

| | | |
|---|---|---|
| 2,497,503 | Jones | Feb. 14, 1950 |
| 2,841,622 | Norton et al. | July 1, 1958 |